(No Model.)
H. C. HENLEY.
HANGER FOR ELECTRIC LAMPS.
No. 522,896.  Patented July 10, 1894.
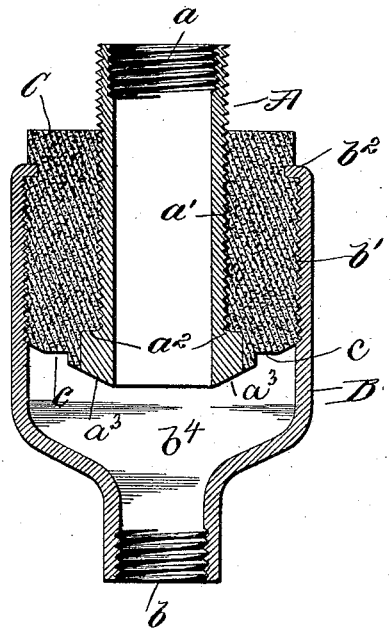
Witnesses:
Inventor:
Henry C. Henley
By Knight Bros.
Attys

UNITED STATES PATENT OFFICE.

HENRY C. HENLEY, OF ST. LOUIS, MISSOURI.

HANGER FOR ELECTRIC LAMPS.

SPECIFICATION forming part of Letters Patent No. 522,896, dated July 10, 1894.

Application filed July 27, 1893. Serial No. 481,590. (No model.)

*To all whom it may concern:*

Be it known that I, HENRY C. HENLEY, of the city of St. Louis, in the State of Missouri, have invented a certain new and useful Improvement in Hangers for Electric Lamps, of which the following is a full, clear, and exact description, reference being had to the accompanying drawing, forming part of this specification.

The object of my invention is to provide a hanger for electric lamps adapted for application to a pendent gas pipe, or other such pipe in the ceiling of a room, or similar position; my said hanger affording complete insulation between the house pipe system and the electric lamp.

A further object of my invention is to prevent bridging or short-circuiting by the passage, from one part of the hanger to the other, of the water, which commonly condenses in gas pipes.

The accompanying drawing is a vertical section of my improved hanger.

A represents a coupling pipe with an internal screw thread $a$, adapted for application to a common gas terminal, an external screw thread $a'$, for the reception and retention of the insulator, presently to be described, and at its lower end an annular shoulder or collar $a^2$, and a bevel $a^3$.

B represents the external shell or lower part of my improved hanger, which is provided at its lower end with a screw thread $b$, for the reception of the electric lamp fixtures, an internal screw thread $b'$, and an inturned flange $b^2$ at its upper end which is spun or swaged down in the form shown after the parts are assembled.

Within the shell B between the lower end of the pipe A and the lower end of the shell is provided a chamber $b^4$ into which the pipe A discharges moisture beneath the insulating material out of reach of the latter.

C represents a compact body of fibrous insulating material, made in annular form to receive the coupling pipe A, and fitting tightly in the screw threads $a'$ and $b'$ on said coupling and within the shell B of the hanger. The insulator C is also formed with an annular recess to fit the collar $a^2$ of the coupling pipe, upon which it is firmly seated, and it is provided, near its upper end, with an annular groove or shoulder in which the inturned flange $b^2$ of the shell B engages, so as to afford secure vertical support or suspension to the lamp and fixtures. In the lower end of the insulator C is formed an annular groove or recess $c$, to prevent the creeping or passage of water by capillary attraction from the lower end of the coupling A over the surface of the insulator, so as by any possibility to form a bridge or short-circuit between the coupling A and the shell B.

Having thus described my invention, the following is what I claim as new therein and desire to secure by Letters Patent:

1. The combination of the externally screw threaded pipe A, the internally screw threaded shell B, having a chamber $b^4$ into which the pipe A discharges moisture and the annular insulator C fitting upon the pipe A and within the shell B out of reach of the moisture discharged from the pipe A; substantially as described.

2. The combination of the coupling pipe A, and shell B having a chamber $b^4$ into which the pipe A discharges moisture of an interposed insulator C, out of reach of the moisture passing through the pipe A, having a cavity or recess $c$ in its lower end to prevent the passage of water between the pipe A and shell B; substantially as described.

3. A hanger for electric lamps comprising a suspension pipe A, formed with an annular shoulder $a^2$ at its lower end and an external screw thread $a'$, an external shell B formed with an inturned flange $b^2$ at its upper end, and an internal screw thread $b'$, and a compact body C of insulating material fitting between the screw threads of the pipe and shell, having an annular recess receiving the shoulder, and an annular groove receiving the flange; substantially as described.

HENRY C. HENLEY.

In presence of—
A. M. EBERSOLE,
BENJN. A. KNIGHT.